United States Patent [19]
Riegel

[11] Patent Number: 5,995,679
[45] Date of Patent: Nov. 30, 1999

[54] PROCESS FOR CODING IMAGE SEQUENCES IN A TRANSMITTER UNIT

[75] Inventor: Thomas Riegel, München, Germany

[73] Assignee: Siemens Aktiengesellschaft, Munich, Germany

[21] Appl. No.: 08/952,797
[22] PCT Filed: May 3, 1996
[86] PCT No.: PCT/DE96/00782
§ 371 Date: Nov. 12, 1997
§ 102(e) Date: Nov. 12, 1997
[87] PCT Pub. No.: WO96/38005
PCT Pub. Date: Nov. 28, 1996

[30] Foreign Application Priority Data

May 22, 1995 [DE] Germany ............................ 195 18 705

[51] Int. Cl.$^6$ ....................................................... G06K 9/00
[52] U.S. Cl. ............................................ 382/284; 382/282
[58] Field of Search ................................. 382/173, 177,
382/180, 232, 239, 240, 241, 242, 243,
276, 277, 278, 279, 282, 283, 284, 285,
293, 300, 309, 307, 308, 311, 233, 244,
248, 304, 253, 422; 395/117, 112; 358/500,
453

[56] References Cited

U.S. PATENT DOCUMENTS

| 5,113,251 | 5/1992 | Ichiyanagi et al. ........................ 358/75 |
| 5,539,866 | 7/1996 | Banton et al. ........................... 395/117 |
| 5,805,228 | 9/1998 | Proctor et al. .......................... 348/422 |
| 5,892,847 | 4/1997 | Johnson .................................. 382/232 |

FOREIGN PATENT DOCUMENTS 0 568 356 A2  3/1993  European Pat. Off. ........ G06F 15/72

OTHER PUBLICATIONS

Fernseh–und Kino–Technik vol. 47, No. 1, S. Hartwig et al, (1993), (Tutorial) Digitale Bildcodierung, pp. 33–42.

Plenary, Special Audio. Underwater Acoustics, VLSI, Neural Networks, (1993) IEEE International Conference on Acoustics, Speech, and Signal Processing, pp. 99–102. (No Author).

Signal Processing: Image Communications, vol. 5, (1993), Frank Fechter et al, Signal Processing for a Digital HDTV Chromakey Mixer, pp. 417–423.

SMPTE Journal, vol. 103, No. 2, Feb. 1994, T. Sprague, Merging Digital Technology into an Analog World, pp. 100–104.

"Coding of Combined Natural & Computer Rendered Image Sequences", Thomas Riegel, SPIE vol. 2451/207–211, pp. 207–211, Munich, Germany, 1995, 0–8194–1802–1/95/.

Primary Examiner—Bijan Tadayon
Attorney, Agent, or Firm—Hill & Simpson

[57] ABSTRACT

The method achieves a reduction of the required transmission capacity. This occurs in that pixels of pixel-based image parts (PB) and corresponding pixels of computer image parts (CB) that overlap are already merged in the transmission unit according to the blue part of the pixel of the pixel-based image part (PB) and according to the computer model attributes, so that a key signal (K) is no longer transmitted. The key signal (K) usually indicates the ratio in which the pixel of the pixel-based image part (PB) should be merged with the pixel of the computer image part (CB). In known methods, this information is not binary. In the receiver unit, thus, the only thing decided is whether the pixel is taken from a partially mixed image sequence (TGB) or from the computer image parts (CB).

3 Claims, 1 Drawing Sheet

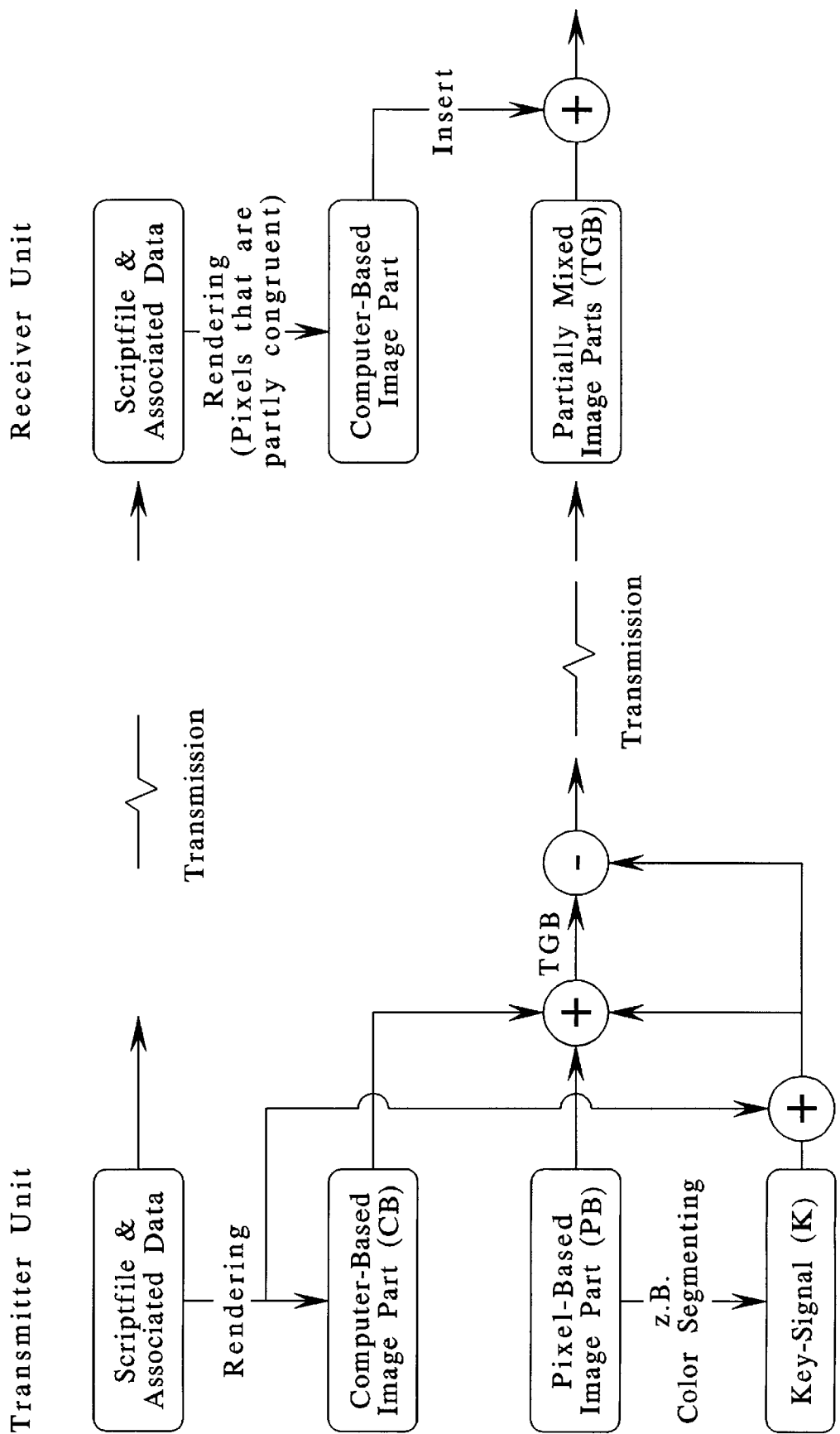

PROCESS FOR CODING IMAGE SEQUENCES IN A TRANSMITTER UNIT

BACKGROUND OF THE INVENTION

In the encoding of image sequences that represent a combination of computer image parts, for example image parts that are constructed from computer graphics, and pixel-based image parts, for example image parts that are registered by a camera, it is known to separately encode and transmit the input data of the computer graphics (script files with associated data) and the pixel-based image parts. It is only at the receiver that the graphics models are then rendered and mixed with the pixel-based image parts. Since the mixing is not a binary operation, the information about the ratio in which the mixing should be carried out must be additionally transmitted for each pixel. This information is stored in a key signal and is acquired by a color segmenting from the camera signal in traditional television (F. Fechter et al., "Signal processing for a digital HDTV chromakey mixer", Signal Processing: Image Communications 5, 1993, pp. 417–423 and T. Sprague, "Merging Digital Technology into an Analog World", SMPTE Journal, February 1994, Vol. 103, No. 2, 1994, pp. 100–104).

Methods are known for transmission that separately encode computer image parts and pixel-based image parts in a transmission unit, together with what is referred to as a key signal that indicates the ratio in which a pixel of a computer image part is to be respectively mixed with the corresponding pixel of the pixel-based image part. In blue box exposures, for example, the key signal is acquired from the pixel-based image parts by a color segmenting. The intensity of the blue coloration thereby indicates the later mixing ratio in which the pixel information of the pixel of the computer image part is mixed with the corresponding pixel information of the pixel-based image part in the receiver unit. The mixing of the two pixel information in the receiver unit is not a binary mixing.

Since the mixing is not binary, much information for the respectively mixing ratio must be transmitted for every dot with the assistance of the key signal. The key signal thus requires a considerable amount of transmission capacity. However, the information of the key signal has no additional informational content for the image itself but merely the information about the ratio in which the images should be mixed together in the receiver unit.

SUMMARY OF THE INVENTION

The invention is based on the problem of already partially mixing image sequences composed of computer image parts and pixel-based image parts in a suitable way and encoding them and thereby eliminating the transmission of the key signal that is normally additionally required.

In general terms the present invention is a method for encoding and decoding image sequences using computer image parts and pixel-based image parts on the basis of a key signal. In a transmission unit, pixel information of a pixel of the computer image part is mixed dependent on the key signal with pixel information of a corresponding pixel of the pixel-based image part to form a partially mixed image sequence. The partially mixed image sequence and the computer image part are transmitted from the transmission unit to a receiver unit. Only completely covering regions of the computer image part are rendered in the receiver unit. The completely covering regions of the computer image part are inserted into predetermined regions of the partially mixed image sequence.

Advantageous developments of the present invention are as follows.

Regions of the partially mixed image sequence that are completely covered by pixels of the computer image parts are blanked out before the encoding.

Regions in the partially mixed image sequence having the block size of the encoder that are completely covered by the computer image parts have a constant luminance value assigned to them.

The inventive method discloses a possibility of modifying the pixel-based image parts of image sequences dependent on the key signal before the encoding in order to be subsequently able to efficiently compress them with block-based encoders (for example, MPEC1 or MPEC2, etc.) and in order to be able to simply mix them binarily in the receiver unit. As a result thereof, the key signal, which contains the information of the mixing ratio of the computer image parts with the pixel-based image parts, can be substantially foregone.

Compared to known methods, the inventive method particularly has the advantage that the key signal that requires considerable transmission capacity in known methods is reduced and, thus, the required transmission capacity is reduced.

A development of the method has the advantage that the image sequence can be efficiently encoded given employment of block-based encoders (for example, MPEG1, MPEG2, etc.).

The receiver unit can be fashioned significantly simpler in that the two image parts can be binarily mixed in the receiver unit dependent on the key signal.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE shows a block circuit diagram that illustrates the inventive method.

DESCRIPTION OF THE PREFERRED EMBODIMENTS

In what are referred to as blue box exposures, a part of the color blue of a pixel (blue part) defines how a pixel-based image part PB is to be mixed with a computer image part CB. What is to be understood in this context by the computer image part CB is, for example, a computer graphic. A decision as to whether and to what extent a corresponding pixel of the computer image part CB is to be inserted is made on the basis of the pure blue part of the respective pixel in the pixel-based image part PB. The intensity of the blue coloration thereby indicates the later mixing ratio of the pixel information of the pixel of the pixel-based image part PB and of the corresponding pixel of the computer image part CB. When a pixel of the pixel-based image part PB is not colored blue, then it remains unaffected, i.e. the pixel of the pixel-based image part PB is not merged with the corresponding pixel of the computer image part CB.

In computer models, whether areas of the computer model are transparent is additionally indicated for the computer image part CB by the material properties. The degree of transparency is likewise stored as computer model attribute. The coordinates in which the computer models are to be inserted into the pixel-based image part PB are also indicated. The calculation of illumination effects (shadow, mirroring, etc.) ensues separately. As a result thereof, a decision as to which pixels of the image are to be darkened or lightened can be made in what is referred to as the rendering. This information respectively enters into the respectively affected pixel, so that this information also enters in in the merging of the pixels of the pixel-based image part PB and the corresponding pixel of the computer image part CB.

In the calculation of a key signal K, all those areas that must be presented transparent, shadowed or lightened in the rendering of the computer models are also additionally written, first, into the key signal K in the form of pixel areas. The degree of the transparency as well as, potentially, illumination effects are co-indicated, these being encoded as gray scale values. Subsequently, those pixels that are colored blue in the pixel-based image part PB are suitably added to the key signal K according to their blue intensity.

The key signal K, with whose assistance the transmission unit can easily decide whether a given pixel must be mixed or not, is obtained on the basis of the procedure described above. For example, the decision in the transmission unit can be made according to the following rules: when the corresponding pixel in the key signal K is white, then the corresponding pixel from the computer image part CB is inserted into a partially mixed image sequence TGB.

In this context, the partially mixed image sequence TGB refers to an image sequence with images whose pixel information was merged with the pixels from the computer image part CB and the corresponding pixels from the pixel-based image part PB.

When the corresponding pixel in the key signal K is black, then the corresponding pixel from the pixel-based image part PB is inserted into the partially mixed image sequence TGB.

When the corresponding pixel in the key signal K exhibits a different brightness for the respective pixel, then the color information of the pixel from the information contained in the computer image part CB and the color information of the corresponding pixel from the pixel-based image part are mixed together. This situation arises, for example, given shadows of objects of the computer image part CB onto regions of the pixel-based image part, as a result whereof the color information of the pixels of the region onto which the shadow of the respective object "falls" is modified.

The mixing ratio is indicated in the key signal K and is calculated in the transmission unit in a way familiar to a person skilled in the art.

After the partially mixed image sequence TGB was formed in the above-described way, regions that are completely covered by regions of the computer image part CB are blanked out before the encoding of the partially mixed image sequence TGB. The information as to whether a region of the computer image part CB completely covers a region of the partially mixed image sequence TGB is contained in an attribute of the 3D models of the computer image part CB.

Subsequently, the symbolic description of the computer image part CB, i.e. a script file and associated data, and the partially mixed image sequence TGB are encoded and transmitted to a receiver unit.

In the receiver unit, only the completely covering regions of the computer image part CB are rendered and inserted into the partially mixed image sequence TGB, as indicated in the attributes of the computer image part, for example the location of the introduced object of is the computer image part CB within the partially mixed image sequence TGB.

A further calculation of, for example, shadows of the introduced objects is no longer necessary in the receiver unit since these were already implemented in the transmission unit. The only thing still remaining, thus, in the receiver unit is a purely binary mixing. The transmission of the key signal K is eliminated.

Given employment of block-based encoders (for example, MPEG1, MPEG2, etc.), it is advantageous to set regions in the partially mixed image sequence TGB having the block size of the encoder that are completely covered by the pixels of the computer image part CB to a constant value. The encoding given block-based encoders is thus considerably more efficiently configured.

A potentially provided post-processing of the image sequences, for example an anti-aliasing for edge smoothing of the decoded, remaining computer image sequences CBR, is implemented at the receiver side.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for encoding and decoding image sequences upon employment of computer image parts and pixel-based image parts based on a key signal, comprising the steps of:

mixing, in a transmission unit, pixel information of a pixel of a computer image part dependent on a key signal with pixel information of a corresponding pixel of a pixel-based image part to form a partially mixed image sequence;

transmitting the partially mixed image sequence and the computer image part are transmitted from the transmission unit to a receiver unit;

rendering only completely covering regions of the computer image part in the receiver unit; and inserting the completely covering regions of the computer image part into predetermined regions of the partially mixed image sequence.

2. The method according to claim 1, wherein regions of the partially mixed image sequence that are completely covered by pixels of the computer image parts are blanked out before encoding the image sequences.

3. The method according to claim 1, wherein regions in the partially mixed image sequence having a block size of an encoder that are completely covered by the computer image parts have a constant luminance value assigned thereto.

* * * * *